United States Patent
Ravi

(10) Patent No.: US 9,483,326 B2
(45) Date of Patent: Nov. 1, 2016

(54) NON-INVASIVE UPGRADES OF SERVER COMPONENTS IN CLOUD DEPLOYMENTS

(71) Applicant: Oracle International Corporation, Redwood Shores, CA (US)

(72) Inventor: Kiran Vedula Venkata Naga Ravi, Belmont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 26 days.

(21) Appl. No.: 13/940,114

(22) Filed: Jul. 11, 2013

(65) Prior Publication Data
US 2015/0019698 A1   Jan. 15, 2015

(51) Int. Cl.
*G06F 15/177*   (2006.01)
*G06F 9/54*   (2006.01)
*G06F 9/445*   (2006.01)

(52) U.S. Cl.
CPC . *G06F 9/54* (2013.01); *G06F 8/65* (2013.01); *G06F 8/67* (2013.01)

(58) Field of Classification Search
CPC .................................................. G06F 8/67
USPC .............................................. 709/221
See application file for complete search history.

(56) References Cited

U.S. PATENT DOCUMENTS

| | | | |
|---|---|---|---|
| 2003/0041094 A1* | 2/2003 | Lara et al. | 709/201 |
| 2008/0071816 A1* | 3/2008 | Gray | 707/101 |
| 2008/0183878 A1* | 7/2008 | Panda et al. | 709/228 |
| 2010/0100970 A1 | 4/2010 | Roy-Chowdhury et al. | |
| 2010/0162226 A1* | 6/2010 | Borissov et al. | 717/173 |
| 2011/0289497 A1 | 11/2011 | Kiaie et al. | |
| 2012/0102480 A1* | 4/2012 | Hopmann et al. | 717/172 |

(Continued)

OTHER PUBLICATIONS

Oracle, "Oracle Knowledge for RightNow Integration Guide", Release 8.5.1, Document No. OKIC-RN185-01, May 2013.

(Continued)

*Primary Examiner* — Wing F Chan
*Assistant Examiner* — Joseph Maniwang
(74) *Attorney, Agent, or Firm* — Vista IP Law Group, LLP; Peter C. Mei

(57) ABSTRACT

A method, system, and computer program product for performing software upgrades. The method serves to preserve an inter-process connection between two endpoints during patching operations. The method commences by suspending at least some communication activity over the inter-process connection while preserving one or more functioning states of the inter-process connection. A patching facility produces a patched endpoint (e.g., a software component) by performing a patch operation to one of the endpoints of the inter-process connection while the at least some communication activity remains suspended. After patching, a process reconfigures at least some of the one or more preserved functioning states of the inter-process connection to connect to the patched endpoint. When the preserved functioning states of the inter-process connection have been restored, then communication activity resumes over the connection, using the patched endpoint. The inter-process communication can comprise one or more connections between a server process and a client process.

20 Claims, 10 Drawing Sheets

(56) References Cited

U.S. PATENT DOCUMENTS

| | | |
|---|---|---|
| 2012/0179822 A1 | 7/2012 | Grigsby et al. |
| 2012/0192172 A1 | 7/2012 | Hansmann et al. |
| 2013/0227689 A1 | 8/2013 | Pietrowicz et al. |
| 2014/0059529 A1* | 2/2014 | Banavalikar et al. ........ 717/170 |
| 2014/0101646 A1* | 4/2014 | Buzaski et al. ............... 717/168 |
| 2014/0258382 A1 | 9/2014 | Tomer et al. |

OTHER PUBLICATIONS

Non-final Office Action dated Jan. 14, 2015 for U.S. Appl. No. 13/940,107.

Notice of Allowance and Fee(s) due dated Jun. 5, 2015 for U.S. Appl. No. 13/940,107.

* cited by examiner

NON-INVASIVE UPGRADES OF SERVER COMPONENTS IN CLOUD DEPLOYMENTS

RELATED APPLICATIONS

The present application is related to co-pending U.S. patent application Ser. No. 13/925,484, entitled "FORMING AN UPGRADE RECOMMENDATION IN A CLOUD COMPUTING ENVIRONMENT", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of enterprise software upgrades and more particularly to techniques for non-invasive upgrades of server components in cloud deployments.

BACKGROUND

Cloud-based provision of infrastructure as a service (IaaS), platforms as a service (PaaS), and software as a service (SaaS) have gained in popularity. A cloud service provider provisions any number of machines (e.g., having a single processor or multiple processors or multi-core processors, etc.) which machines can run an operating system (e.g., Linux) directly on the hardware or the machines can run virtual operating systems (e.g., using virtual machines, possibly including a hypervisor). This flexibility is a boon to cloud service providers and to their customers (e.g., tenants) alike, yet the cloud model introduces new problems to be solved. For example, while the cloud provisioning model makes it easy to deploy software applications to many nodes (e.g., tens, hundreds, thousands or more), the cloud provisioning model does not address the tasks involved in upgrading those applications. Upgrading software in an instance is generally accompanied by a blackout or brownout while the software is being upgraded. While the cloud provisioning model makes it convenient to deploy many nodes in a cascade, the blackout or brownout experienced while the software is being upgraded can become quite severe, especially in mission-critical deployments. Still worse, in a deployed client-server situation where many (e.g., tens, hundreds, thousands or more) clients are connected to a single server, a blackout or brownout can affect many tens, hundreds, thousands or more users.

What's needed is a technique or techniques to minimize or eliminate blackouts or brownouts while the cloud-deployed server software is being upgraded. There is a need for an improved approach since none of the legacy technologies perform the herein-disclosed techniques for non-invasive upgrades of server components in cloud deployments.

SUMMARY

The present disclosure provides an improved method, system, and computer program product suited to address the aforementioned issues with legacy approaches. More specifically, the present disclosure provides a detailed description of techniques used in methods, systems, and computer program products for non-invasive upgrades of server components in cloud deployments.

One embodiment comprises a computer implemented method to preserve an inter-process connection between two endpoints during patching operations by suspending at least some communication activity over the inter-process connection while preserving one or more functioning states of the inter-process connection. The method includes producing a patched endpoint (e.g., a software component) by performing a patch operation to one of the endpoints of the inter-process connection while the at least some communication activity remains suspended, and then reconfiguring at least some of the one or more preserved functioning states of the inter-process connection to connect to the patched endpoint. When the preserved functioning states of the inter-process connection have been restored, then the method can resume communication activity over the connection using the patched endpoint. The inter-process connection can comprise a connection between a server process and a client process, and the preserved functioning states of the inter-process connection can comprise a keep-alive operation.

Some embodiments initiate the suspension of communication activity over the inter-process connection is performed using a surrogate process, possibly responsive to a signal or an indication initiated by a cloud tenant. The suspension and restoration of communication activity over the inter-process connection is performed using a process table, which can be used by a surrogate process or a surrogate process manager.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1:
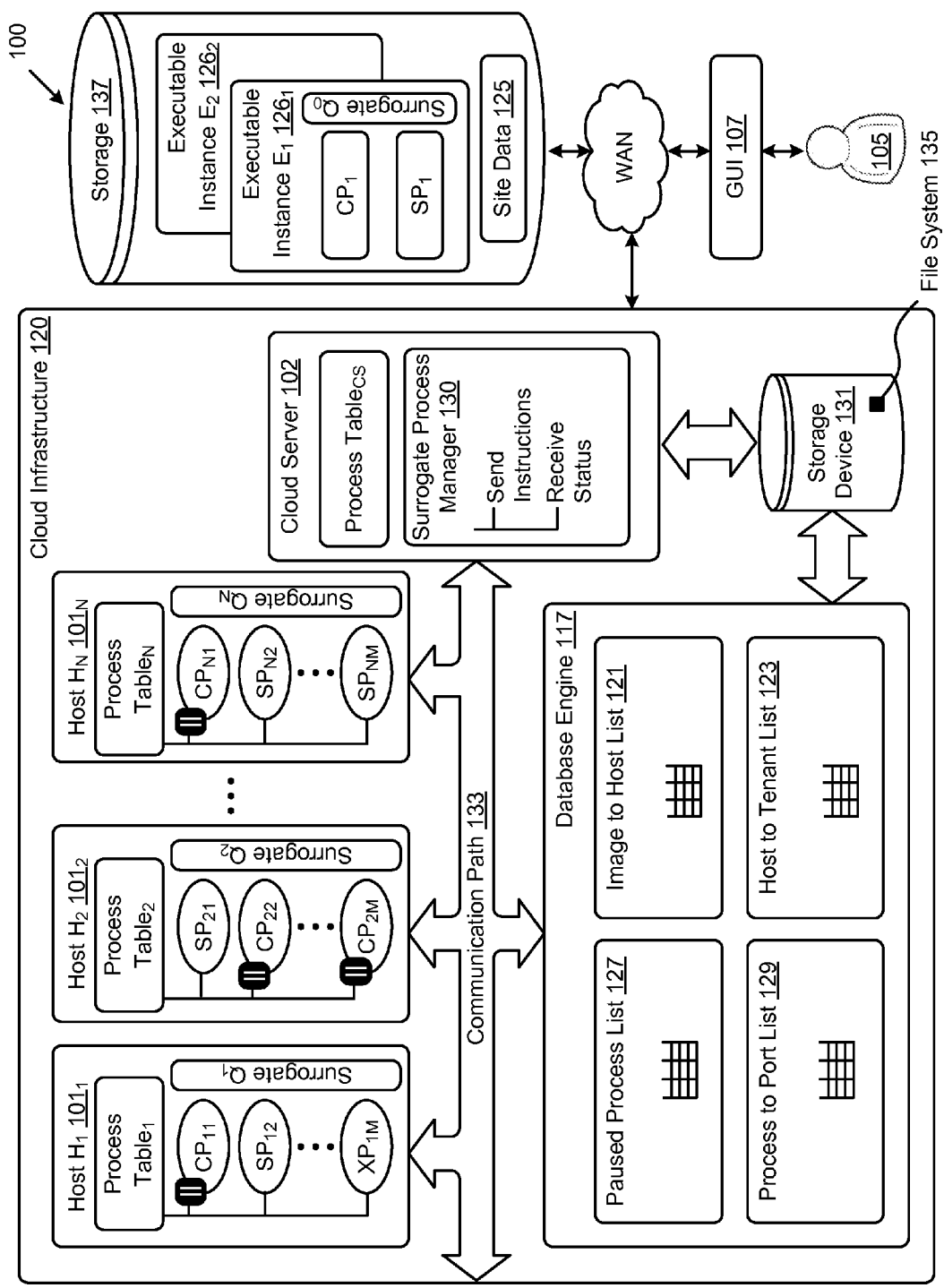
FIG. 1 depicts an instance of a cloud deployment for practicing non-invasive upgrades of server components in cloud deployments, according to some embodiments.

Embodiments of the present disclosure address solutions for implementing non-invasive upgrades of server components in cloud deployments. More particularly, disclosed herein and in the accompanying figures are exemplary environments, methods, and systems for implementing non-invasive upgrades of server components in cloud deployments.

Overview

In the context of cloud provisioning (e.g., IaaS, PaaA, or SaaS), and more particularly, in a deployment of a client-server model where many (e.g., tens, hundreds, thousands or more) clients are connected to a single server, server reliability/uptime is highly valued by users. In many enterprise application situations, a server may service many client connections, yet establishing client connections are frequently expensive to create, and are often 'fragile' in that they can be easily 'broken'. For example, a connection that becomes unused nevertheless consumes resources, and such resources should be reclaimed if the connection moves into disuse. Or, if a connection is initially established by a client process, and that client process dies, the resources allocated to that connection should be reclaimed. Operating systems and virtual machines can autonomously tear-down unused connections, however, as just indicated, establishing client connections are frequently expensive to create and/or a broken connection often precipitates unwanted effects (e.g., lost work, lost time, etc.).

Legacy techniques perform patching by (i) stopping the running software, (ii) patching the software image, and (iii) re-running the software with the patched software image. Unfortunately, this legacy technique necessitates termination, tear-down, and re-establishing of client connections. In some cases, a terminated connection can result in significant user perturbations (e.g., an unwanted logout situation or a process 'freeze', lost work, lost time, etc.).

Techniques are needed to preserve a connection even while a patching operation is underway. In an exemplary embodiment, connections are preserved even while a patching operation is underway by:
- suspending communication activity over a connection while preserving the integrity of the connection,
- performing a patch operation to one of the endpoints of the connection,
- reconfiguring the connection to connect to the patched endpoint, and
- resuming communication activity over the connection (possibly responsive to a signal).

DEFINITIONS

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1 depicts an instance of a cloud deployment 100 for practicing non-invasive upgrades of server components in cloud deployments. As an option, the present cloud deployment 100 or any aspect thereof may be implemented in the context of the architecture and functionality of the embodiments described herein. Also, the cloud deployment 100 or any aspect thereof may be implemented in any desired environment.

As shown, the cloud infrastructure 120 comprises a plurality of computing machines (e.g., host $H_1$ $101_1$, host $H_2$ $101_2$, host $H_N$ $101_N$, etc.) configured for communication over a communication path 133 to a database engine 117 and a cloud server 102. The cloud infrastructure can be configured by an administrator and/or by a user 105. Further, a user can access and configure the cloud server 102 via a graphical user interface (e.g., GUI 107). Such a user might also configure (e.g., initially configure and/or maintain) site storage 137, which contains an executable instance (e.g., executable instance E1 $126_1$, executable instance E2 $126_2$, etc.). Such an instance image 126 comprises an instance image copy of a client process (e.g., $CP_1$) and an instance image copy of a server process (e.g., $SP_1$). Site storage 137 might also contain an initial copy of site information data 125.

Any host (e.g., host $H_1$ $101_1$, host $H_2$ $101_2$, host $H_N$ $101_N$, etc.) can host software, execute processes, and maintain a process table (e.g., process table$_1$, process table$_2$, process table$_N$, etc.).

Further, any host can communicate with any other host, any host can communicate with the database engine, and any host can communicate with the cloud server 102, which can in turn maintain its own process table (e.g., process table$_{CS}$, as shown).

More particularly, a host can run any number of occurrences of a client process agent (e.g., $CP_{11}$, $CP_{22}$, $CP_{2M}$, $CP_{N1}$, etc.) and a host can also run any number of occurrences of server processes (e.g., $SP_{12}$, $SP_{21}$, $SP_{N2}$, etc.) and/or other processes (e.g., surrogate $Q_1$, surrogate $Q_2$, surrogate $Q_N$, $XP_{1M}$, etc.). Any or all of the foregoing processes can be run on "bare metal", or can be run under an operating system or hypervisor. In exemplary embodiments, the surrogate processes running on each host communicates with the cloud server 102. Various particular functions of the surrogate running on each host are discussed below.

The database engine 117 serves as a repository for data, which data can be stored and accessed as a relational database relation, or as a file, or as a memory-resident data structure. As shown, database engine 117 comprises a paused process list 127, a process to port list 129, an image to host list 121, and a host to tenant list 123.

In the particular embodiment of FIG. 1, an instance of vendor-built surrogate (e.g., surrogate $Q_0$) is accessible over the cloud infrastructure (e.g., over a WAN), and each host runs its own copy of the surrogate (e.g., see surrogate $Q_1$, surrogate $Q_2$, and surrogate $Q_N$). The surrogate program can perform the following functions while practicing non-invasive upgrades of server components:

Receive instructions to perform operations on a given port or connection,
Intercept new connection requests,
Block or otherwise decline new connection requests, and
Keep track of blocked new connection requests.

The surrogate program can communicate with a cloud server 102 using any protocol (e.g., HTTP, SOAP, web services, REST, socket interactions, etc.). In exemplary deployments, such protocols are supported by the cloud vendor; however, it is possible that certain communications between the cloud server 102 and surrogate programs can be performed using other protocols (e.g., including custom protocols).

The cloud server 102 runs a surrogate process manager 130. The cloud server and any process it runs can access any host and can access the storage device 131 either natively (e.g., via a file protocol) or via a database engine connection, possibly using a query language such as SQL. The surrogate process manager 130 can access any aspect of any host. In the event that the bare metal or hypervisor software does not natively provide access to any particular aspect of the corresponding host, the surrogate or surrogate process manager 130 can be configured to provide the needed access using any protocol.

Upgrade Overview

Following the embodiments within cloud deployment 100, non-invasive upgrades of server components can be practiced. For example:

A cloud environment can be configured to comprise physical machines (e.g., hosts $H_1 \ldots H_N \ldots H_X$). Each host is configured to run one or more programs or processes. The status of each process is maintained in a process table.
The process table may be integrated into the operating system, or hypervisor, or virtual machine.
Each running process (e.g., CP or SP) is a running instance of an executable from executable instance $E_1$. There may be more than one process that uses the same executable. For example, the executable instance $E_1$ (comprising $CP_1$) is loaded on multiple hosts, and initially, the loaded images are identical.
Each process CP and/or SP communicates with one or more cloud servers 102 over the communication path 133 using any one or more possible schemes such as TCP/IP sockets.
Each process CP or SP is run in the context of a cloud tenant (e.g., a customer of the cloud vendor).

In one exemplary embodiment, a server process implements an enterprise software application (e.g., accounts payable), and a client process handles user interface aspects. A server process may support any number of clients via one or more connections, and also a server process may connect to a database engine 117.

The above organization is purely exemplary. Other organizations are reasonable and envisioned, one of which is presented in FIG. 2.

Figure 2:
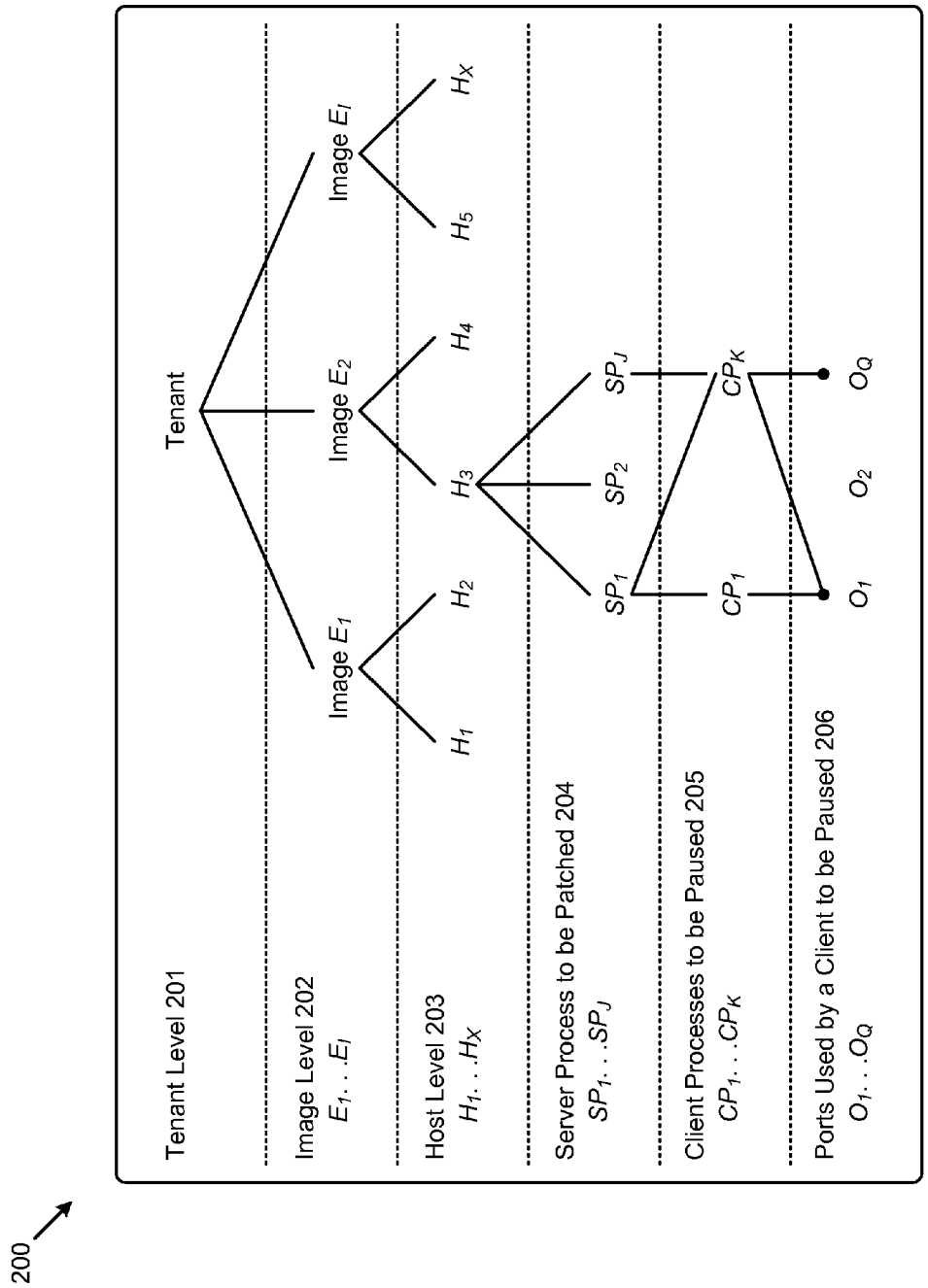
FIG. 2 depicts a hierarchical organization of interrelated entities for practicing non-invasive upgrades of server components in cloud deployments, according to some embodiments.

FIG. 2 depicts a hierarchical organization 200 of interrelated entities for practicing non-invasive upgrades of server components in cloud deployments. As an option, the present hierarchical organization 200 or any aspect thereof may be implemented in the context of the architecture and functionality of the embodiments described herein. Also, the hierarchical organization 200 or any aspect thereof may be implemented in any desired environment.

As shown, the highest level of the hierarchy is the tenant (see tenant level 201). A tenant may specify any number of images (see image level 202) which may be embodied as an executable instance (e.g., executable instance $E_1$ 126$_1$, executable instance $E_2$ 126$_2$, etc.). An image can be associated with any number of hosts (see host level 203), and an image can be loaded onto any number of hosts (e.g., host $H_1$ 101$_1$, host $H_2$ 101$_2$, etc.) for execution. Continuing, a given host can be executing any number of server processes (see server processes to be patched 204). The server processes to be patched are exemplified by the aforementioned $SP_{12}$, $SP_{21}$, $SP_{N2}$, etc., and a particular server process to be patched can be in communication (e.g., over a connection) with one or more client processes (see client processes to be paused 205). A particular connection can use one or more ports (see ports used by a client to be paused 206). As shown, ports are designated as $O_1, \ldots O_Q$.

The foregoing hierarchical organization 200 is merely illustrative, and other organizations are possible. More particularly, the operations and flows of the techniques described herein do not rely on any particular organization. Further, the aforementioned lists (e.g., paused process list 127, process to port list 129, image to host list 121, and host to tenant list 123) can be conveniently stored as a list, or as a relation, or in any data structure, including persistent storage in a layout within a file system 135.

Figure 3:
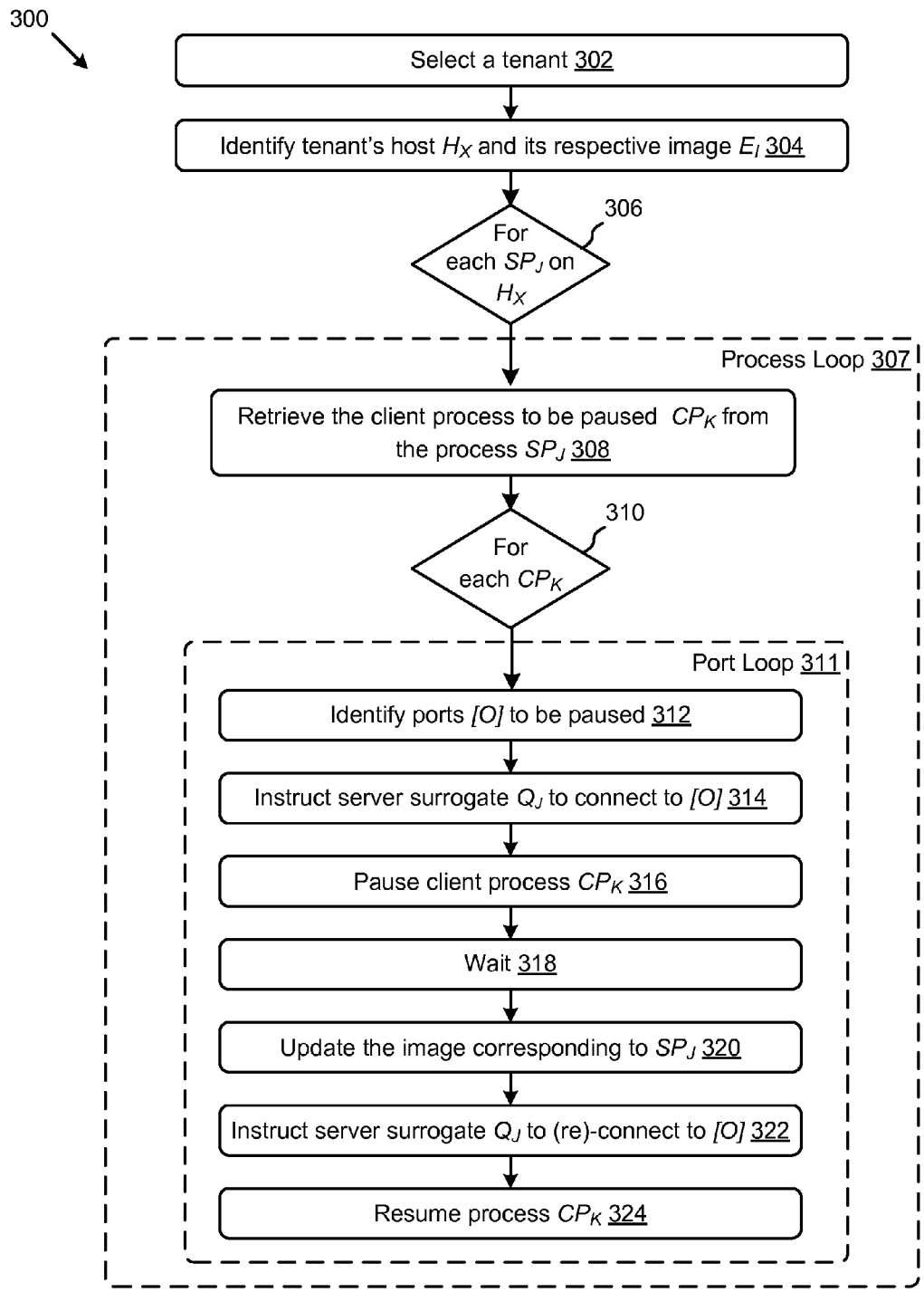
FIG. 3 is a pause-preserve-update-resume cycle as used in systems for practicing non-invasive upgrades of server components in cloud deployments, according to some embodiments.

FIG. 3 is a pause-preserve-update-resume cycle 300 as used in systems for practicing non-invasive upgrades of server components in cloud deployments. As an option, the present pause-preserve-update-resume cycle 300 or any aspect thereof may be implemented in the context of the architecture and functionality of the embodiments described herein. Also, the pause-preserve-update-resume cycle 300 or any aspect thereof may be implemented in any desired environment.

As earlier indicated in the discussion of FIG. 2, the highest level of the shown hierarchy is a tenant. For the specific pause-preserve-update-resume cycle 300, a tenant may have indicated the tenant's desire for an upgrade of certain applications (e.g., upgrade of the accounts payable application or other applications embodied as a server process), thus that tenant is selected (see operation 302), and the images for that tenant are identified (e.g., using a lookup from an image to host list 121), as well as the hosts for that tenant are identified (e.g., using a lookup from a host to tenant list 123). Given the identification of the tenant's hosts $H_X$ and the tenant's images $E_I$ (see operation 304) the server processes from within $E_I$ that are running on $H_X$ are identified, and for each server process $SP_J$ on $H_X$, a process loop is entered (see process loop 307).

The process loop commences by retrieving the client processes to be paused (see operation 308). Such a retrieval can be facilitated by the process table on host $H_X$ (e.g., process table$_1$, process table$_2$, process table$_N$, etc.). Or, the client processes CP$_K$ to be paused for a particular host can be retrieved using a protocol implemented by any of the server processes running on that particular host. Next, an iterator 310 (e.g., see the loop test/increment) is formed, and a port loop 311 is entered. Having the client processes CP$_K$ to be paused, a list of ports (e.g., ports corresponding to connections used by processes CP$_K$ for connecting to server process SP$_J$) can be formed, thus the port loop operation 312 serves to identify a list of ports [O] to be paused. A process to port list 129 can be used in port loop operation 312, or any other technique for retrieval or identification of a list of ports to be paused can be employed. At this point in the pause-preserve-update-resume cycle 300 it is known which processes will be affected. That is, it is known which client processes will be paused, and which surrogate processes will be used as a proxy for the paused client processes, and which server processes will be stopped then restarted with the upgraded/patched images. It is further known or implied which new server processes are to be initiated (e.g., using the upgraded/patched images), and which paused client processes are to be unpaused and resumed.

As earlier indicated, the connections between a client process and a corresponding server process are to be held in a live state, even while the server process to be patched is down or in the middle of the process of being restarted or otherwise not connected to its clients. As such, operations within port loop 311 serve to instruct a surrogate Q$_J$ to connect to the ports identified in port loop operation 312. Once the surrogate Q$_J$ has successfully connected to the ports identified in port loop operation (see operation 314), the client process (or processes) for which the surrogate is acting as a connection proxy can be paused (see operation 316). There is no need to kill the client process(es). Moreover, the remaining steps of the pause-preserve-update-resume cycle 300 require relatively few cycles, and thus the real-time consumed for executing the pause-preserve-update-resume cycle 300 might be undetectable by any user of the paused client processes and/or the upgraded server processes.

The remaining steps of the pause-preserve-update-resume cycle 300 include a wait state (see wait operation 318), an operation to update the server process with the updated/patched image (see operation 320), an operation to instruct the server surrogate to reconnect to the ports of port list [O] (see operation 322), and then to resume (e.g., unpause) the client process CP$_K$ (see operation 324).

The port loop 311 is repeated for each process SP$_J$ on each host H$_X$. Thus, all of the server processes in the cloud deployment that are affected by the upgraded server image for that tenant are upgraded—with minimal, possibly undetectable brown-out during the upgrade.

Figure 4:
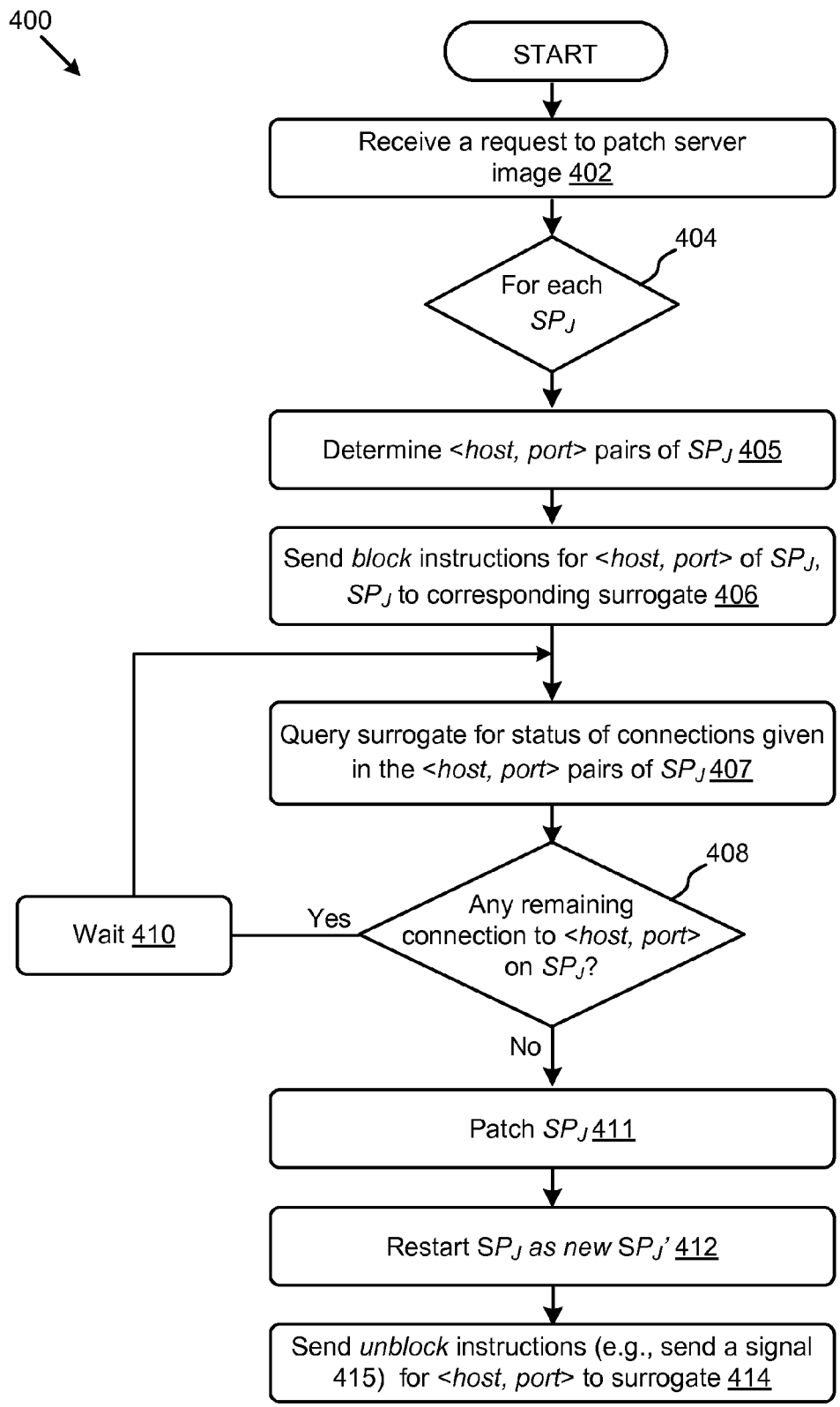
FIG. 4 is a flowchart showing a series of server image patching operations as used in systems for practicing non-invasive upgrades of server components in cloud deployments, according to some embodiments.

FIG. 4 is a flowchart showing a series of server image patching operations 400 as used in systems for practicing non-invasive upgrades of server components in cloud deployments. As an option, the present server image patching operations or any aspect thereof may be implemented in the context of the architecture and functionality of the embodiments described herein. Also, the server image patching operations or any aspect thereof may be implemented in any desired environment.

The context of cloud deployment 100 shows a cloud server 102, which in turn includes a surrogate process manager 130. The server image patching operations 400 can be implemented as a feature of surrogate process manager 130. Specifically, surrogate process manager 130 can operate cooperatively with any one or more surrogate processes (e.g., surrogate Q$_1$, surrogate Q$_2$, surrogate Q$_N$, etc.). The shown server image patching operations 400 commences upon receipt of a request to patch a particular server image (see operation 402). Then an iterator 404 is established such that all instances of a corresponding server process SP$_J$ across all instances of hosts used by the tenant are subjected to the upgrade. Thus, for each occurrence (on any host) of server process SP$_J$, data pairs are formed to comprise a host and a set of corresponding ports used by that server process (see the <host, port> notation in operation 405). Having the set of corresponding ports used by that server process (e.g., in <host, port> notation), then operation 406 serves to send instructions to the surrogate of the given host of the <host, port> pair, the instructions comprising one or more instructions to block any new requests for the port in the <host, port> pair. For a short duration (e.g., until the conclusion of server image patching operations 400) new connections are refused. In some cases the connections are refused in a manner that would cause the requestor to retry. In other cases, the connection is acknowledged to the requestor, even though the connection does not become operable until a later moment. The behavior of the surrogate is further discussed in FIGS. 5A and 5B, below.

The surrogate on a host can at least know the status of any of the ports in the <host, port> pair, and can reply to a query (see operation 407). So long as there remain open connections (e.g., connections that have not yet been taken over by the surrogate) then the surrogate process manager 130 loops through a wait state 410 and query to know the status of any of the ports query (see operation 407). When there are no further open connections (see decision 408), then processing can proceed to apply the patch. Specifically, the patch for SP$_J$ is applied. The application of a patch (see operation 411) can be implemented in a variety of ways, possibly including killing the unpatched version, then restarting SP$_J$ from the patched image. Other possibilities include a particular implementation of SP$_J$ whereby a signal is sent to SP$_J$ whereafter SP$_J$ gracefully terminates without forcefully killing the connections, thus leaving the connections of the surrogate intact.

After, the patch for SP$_J$ is applied, a new process SP$_J$' is initiated (see operation 412). When a new process SP$_J$' has reached a stable state, then the surrogate process manager 130 sends unblocking instructions to the surrogate (see operation 414).

In some embodiments, a surrogate process blocks all connections from Host Hi to SPj, and the surrogate process may implement a data structure for queuing incoming connection requests and releasing them once the surrogate manager has sent an unblock instruction for SP$_J$'.

As earlier indicated, in the context of cloud deployment 100 the server image patching operations 400 can be implemented as a feature or features of surrogate process manager 130, which can operate cooperatively with any one or more surrogate processes (e.g., surrogate Q$_1$, surrogate Q$_2$, surrogate Q$_N$, etc.). In addition to the cooperation hereinabove described, additional possibilities for cooperation are discussed hereunder as pertaining to FIG. 5A and FIG. 5B.

Figure 5A:
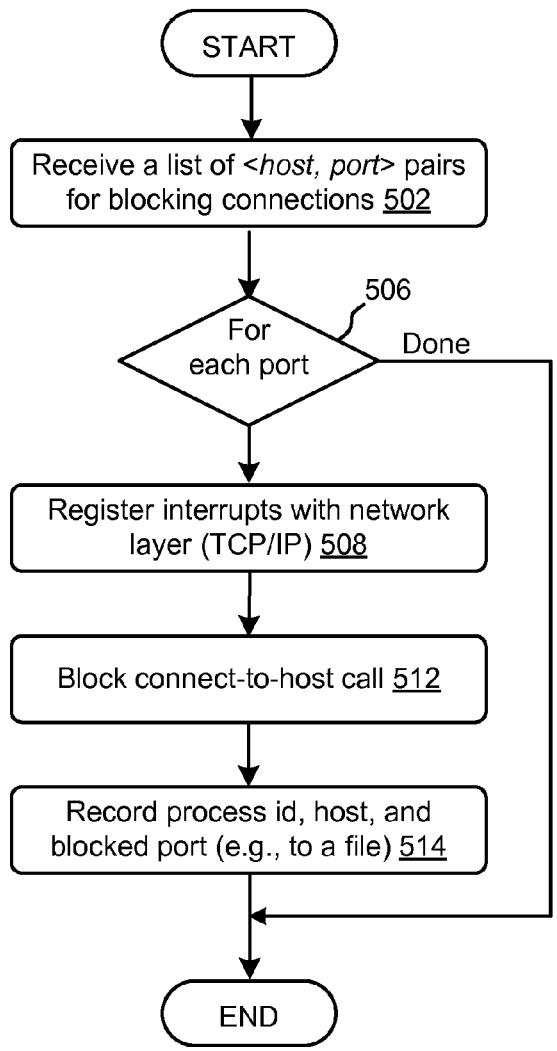
FIG. 5A is a flowchart showing a surrogate blocking operation flow as used in systems for practicing non-invasive upgrades of server components in cloud deployments, according to some embodiments.

FIG. 5A is a flowchart showing a surrogate blocking operation flow 5A00 as used in systems for practicing non-invasive upgrades of server components in cloud deployments. As an option, the present surrogate blocking operation flow 5A00 or any aspect thereof may be implemented in the context of the architecture and functionality of the embodiments described herein. Also, the surrogate blocking operation flow 5A00 or any aspect thereof may be implemented in any desired environment.

As heretofore discussed, a surrogate process implements the surrogate blocking operation flow 5A00. Specifically the surrogate process receives ports via the <host, port> pairs (see operation 502), and for each port (see iterator 506), registers interrupts with the network layer (see operation 508). Incoming requests for connections are thus routed to the surrogate, which in turn can block any incoming connect-to-host requests (see operation 512). In some embodiments of surrogate blocking operation flow 5A00, for any requests that were blocked (see operation 512) the details of the request and response are stored for later access. For example, surrogate blocking operation flow 5A00 might make a non-volatile (e.g., file) record of the id of the request, the host, and the blocked port (see operation 514).

In another timeframe, the blocking operations implemented in the surrogate blocking operation flow 5A00 can be unblocked. Unblocking operations are now briefly discussed.

Figure 5B:
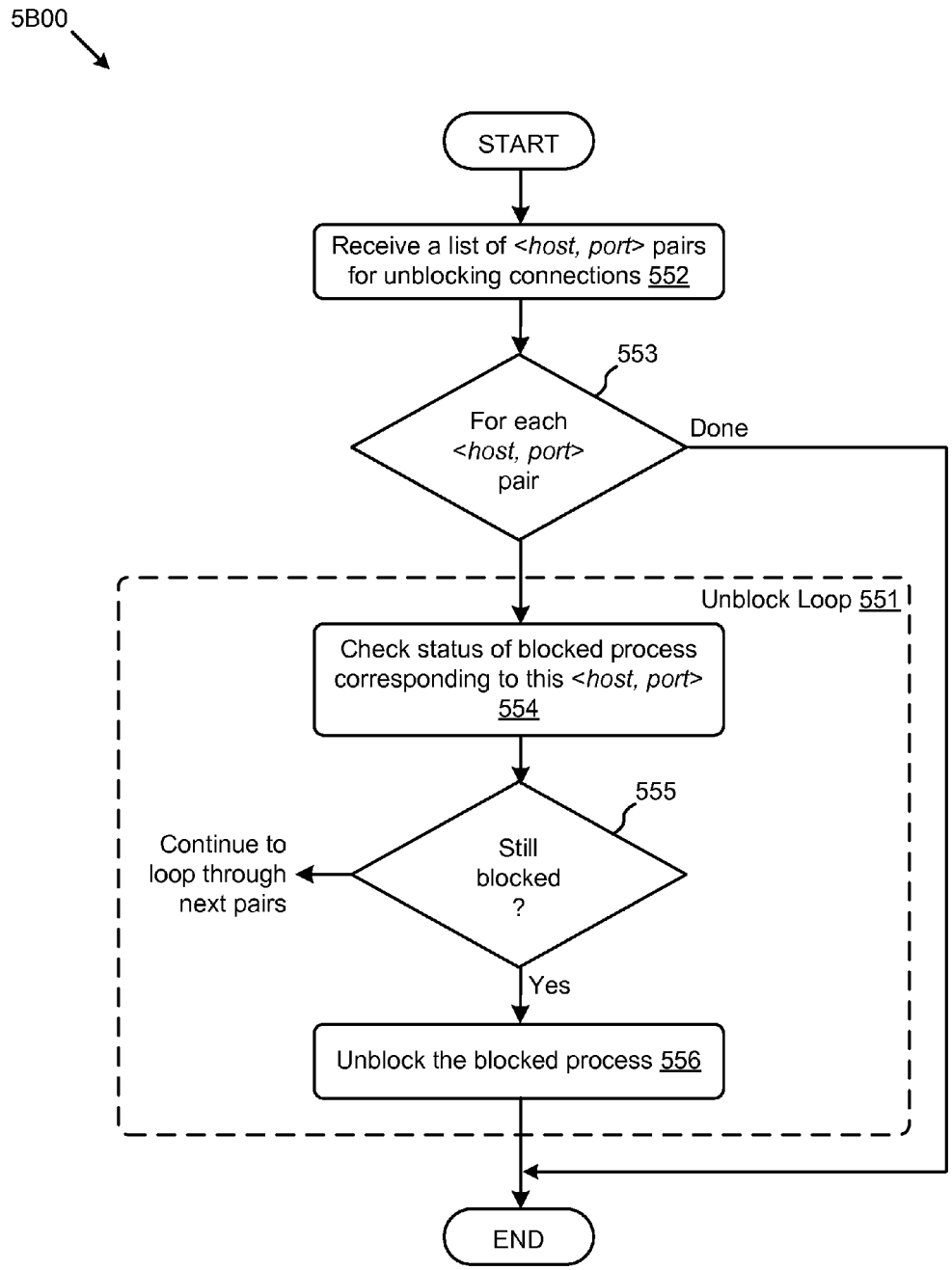
FIG. 5B is a flowchart showing a surrogate unblocking operation flow as used in systems for practicing non-invasive upgrades of server components in cloud deployments, according to some embodiments.

FIG. 5B is a flowchart showing a surrogate unblocking operation flow 5B00 as used in systems for practicing non-invasive upgrades of server components in cloud deployments. As an option, the present surrogate unblocking operation flow 5B00 or any aspect thereof may be implemented in the context of the architecture and functionality of the embodiments described herein. Also, the surrogate unblocking operation flow 5B00 or any aspect thereof may be implemented in any desired environment.

The surrogate unblocking operation flow 5B00 can commence at any time. The unblocking operations commence upon or after receipt of ports via <host, port> pairs corresponding to desired unblocking operations (see operation 552). An iterator is formed (see decision 553) and for each <host, port> pair, an unblock loop 551 is entered. Operations within the loop (see operation 554) check the status of the (formerly) blocked process $SP_j$, and if the status of the (formerly) blocked process $SP_j$ is still blocked (see decision 555), then an operation to unblock the blocked process is executed (see operation 556). The loop repeats until all processes corresponding to the <host, port> pairs have been unblocked. When all processes corresponding to all of the <host, port> pairs (see decision 553) have been unblocked, the flow terminates.

Additional Embodiments of the Disclosure
Practical Applications

Figure 6:
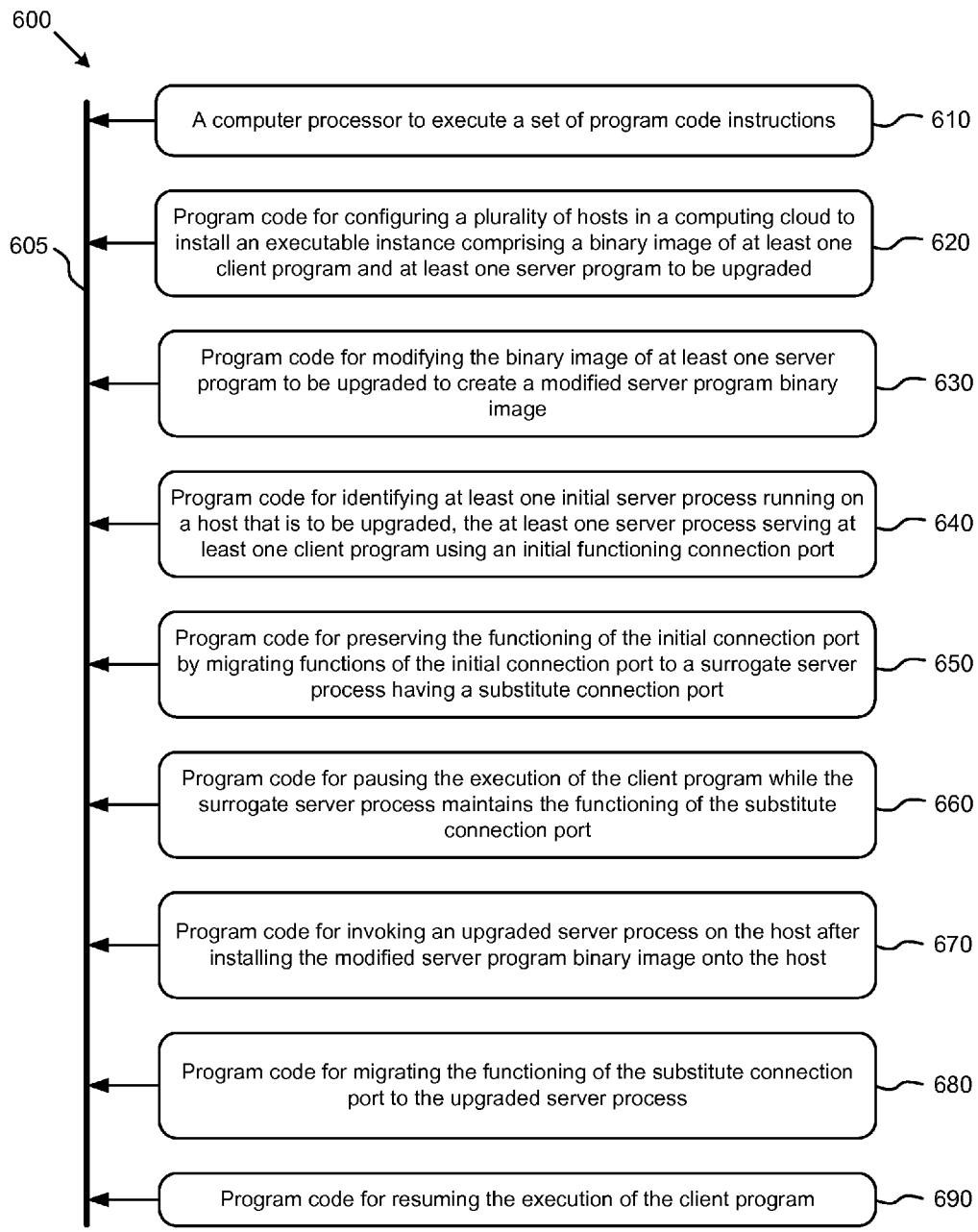
FIG. 6 is a block diagram of a system for implementing non-invasive upgrades of server components in cloud deployments, according to some embodiments.

FIG. 6 is a block diagram of a system for implementing non-invasive upgrades of server components in cloud deployments, according to some embodiments. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: configuring a plurality of hosts in a computing cloud to install an executable instance comprising a binary image of at least one client program and at least one server program to be upgraded (see module 620); modifying the binary image of at least one server program to be upgraded to create a modified server program binary image (see module 630); identifying at least one initial server process running on a host that is to be upgraded, the at least one server process serving at least one client program using an initial functioning connection port (see module 640); preserving the functioning of the initial functioning connection port by migrating functions of the initial connection port to a surrogate server process having a substitute connection port (see module 650); pausing the execution of the client program while the surrogate server process maintains the functioning of the substitute connection port (see module 660); invoking an upgraded server process on the host after installing the modified server program binary image onto the host (see module 670); migrating the functioning of the substitute connection port to the upgraded server process (see module 680); and resuming the execution of the client program (see module 690).

Figure 7:
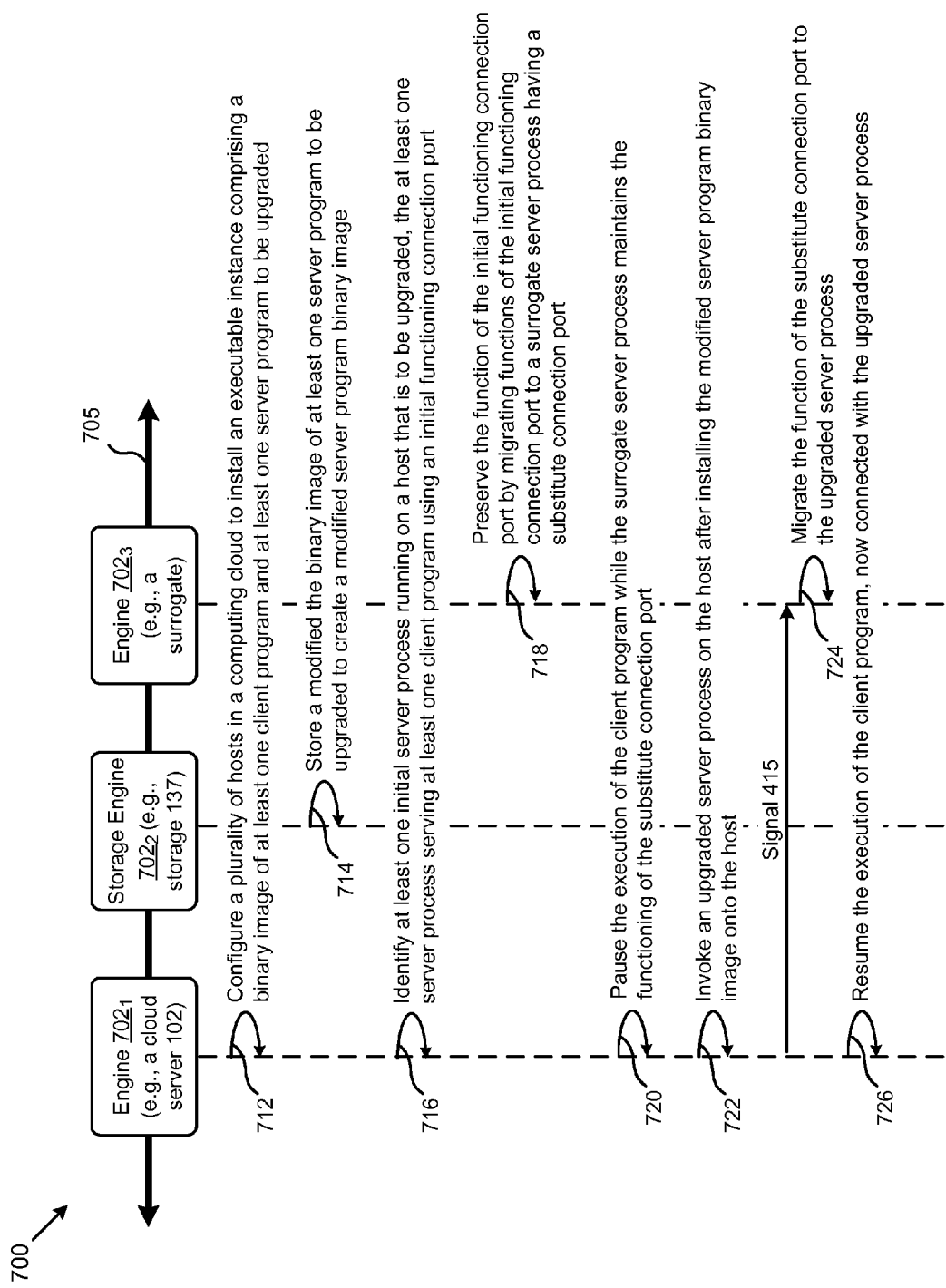
FIG. 7 is a block diagram of a system for implementing non-invasive upgrades of server components in cloud deployments, according to some embodiments.

FIG. 7 is a block diagram of a system for implementing non-invasive upgrades of server components in cloud deployments, according to some embodiments. As shown, an engine $702_1$ (e.g., a cloud server 102, or a signaling engine) communicates with a storage engine $702_2$ (e.g., site storage 137), and also communicates with engine $702_3$ (e.g., a surrogate), which communication uses path 705.

In an exemplary sequence of operations, the engines serve to:

configure a plurality of hosts in a computing cloud to install an executable instance comprising a binary image of at least one client program and at least one server program to be upgraded (see operation 712);

store a modified the binary image of at least one server program to be upgraded to create a modified server program binary image (see operation 714);

identify at least one initial server process running on a host that is to be upgraded, the at least one server process serving at least one client program using an initial functioning connection port (see operation 716);

preserve the function of the initial functioning connection port by migrating functions of the initial functioning connection port to a surrogate server process having a substitute connection port (see operation 718);

pause the execution of the client program while the surrogate server process maintains the functioning of the substitute connection port (see operation 720);

invoke an upgraded server process on the host after installing the modified server program binary image onto the host (see operation 722);

migrate the function of the substitute connection port to the upgraded server process (see operation 724), possibly in response to receiving a signal from engine $702_1$; and then resume the execution of the client program, now connected with the upgraded server process (see operation 726).

Figure 8:
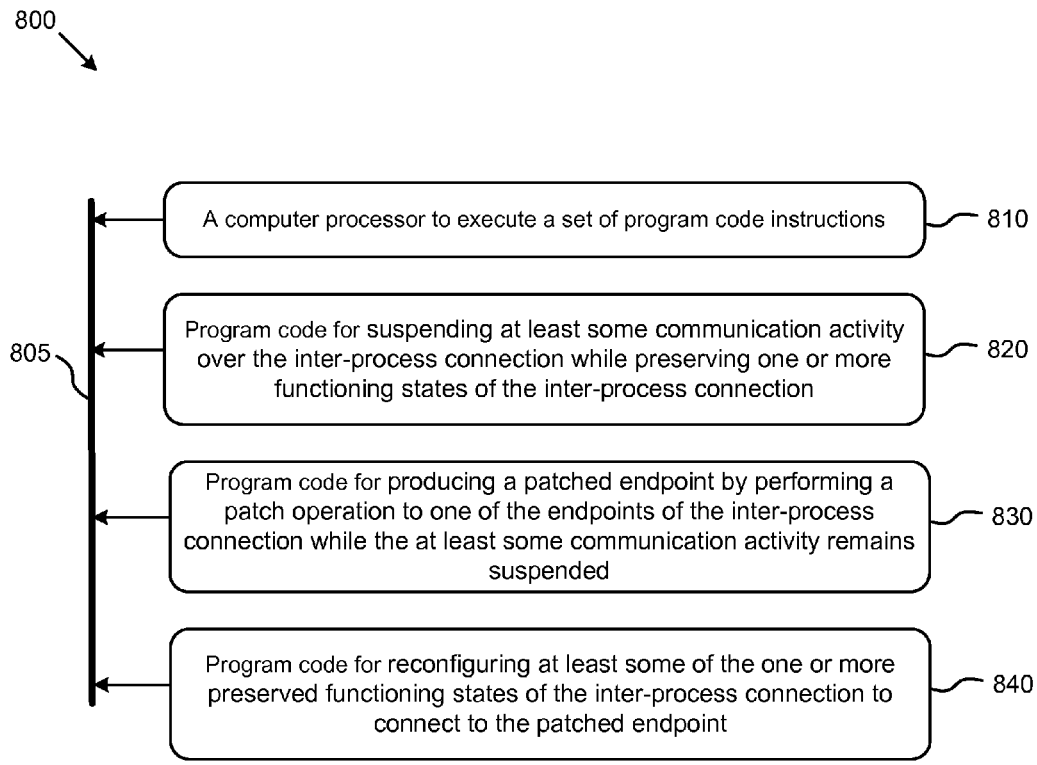
FIG. 8 is a block diagram of a system for implementing non-invasive upgrades of server components in cloud deployments, according to some embodiments.

FIG. 8 is a block diagram of a system for implementing non-invasive upgrades of server components in cloud deployments, according to some embodiments. As an option, the present system 800 may be implemented in the context of the architecture and functionality of the embodiments described herein. Of course, however, the system 800 or any operation therein may be carried out in any desired environment.

As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: suspending at least some communication activity over the inter-process connection while preserving one or more functioning states of the inter-process connection (see module 820); producing a patched endpoint by performing a patch operation to one of the endpoints of the inter-process connection while the at least some communication activity remains suspended (see module 830); and reconfiguring at least some of the one or more preserved functioning states of the inter-process connection to connect to the patched endpoint (see module 840).

System Architecture Overview
Additional Practical Applications

Figure 9:
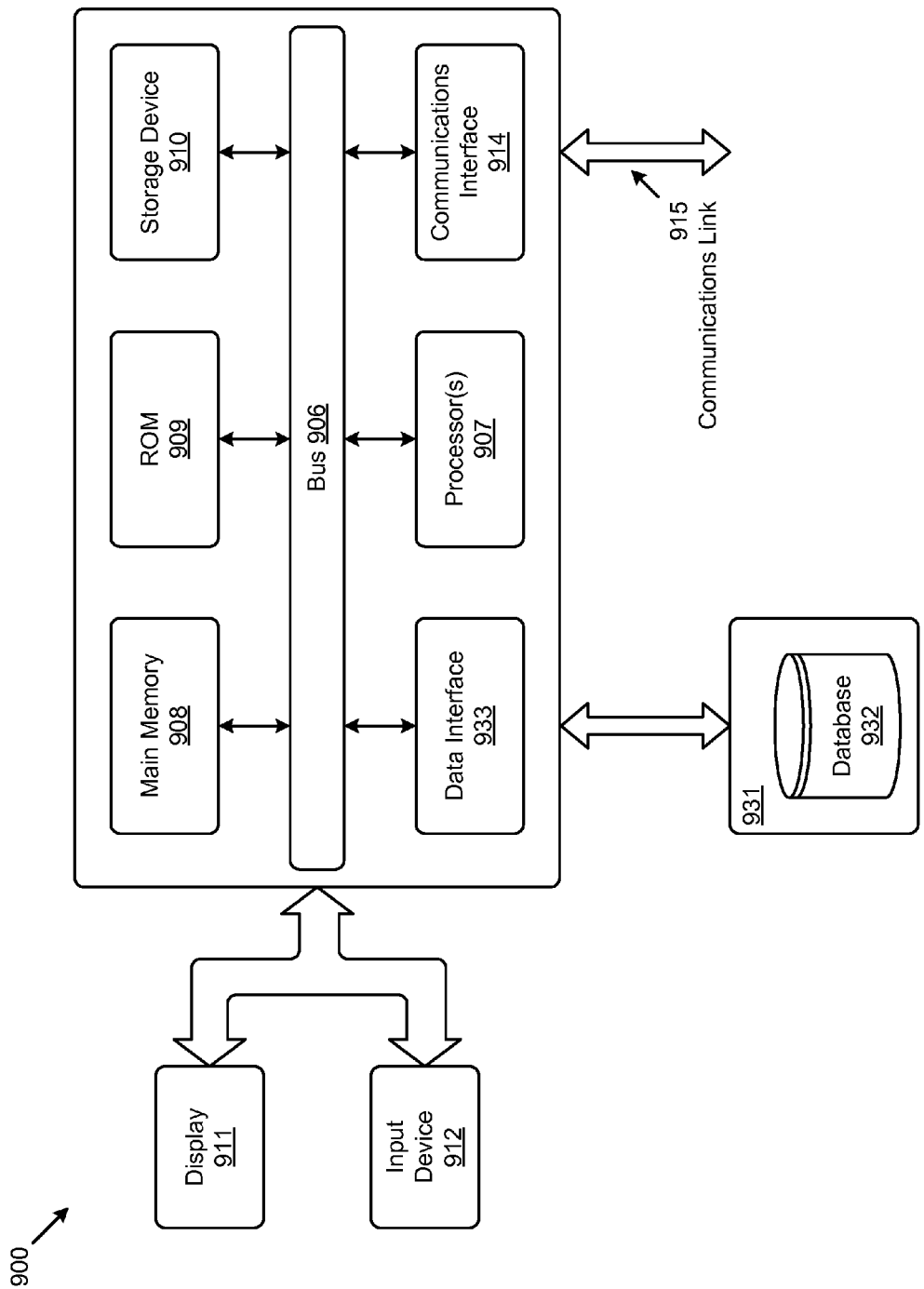
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device (e.g., ROM 909), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more computer systems 900 coupled by a communications link 915 (e.g., LAN, PTSN, or wireless network) may perform the sequence of instructions required to practice the disclosure in coordination with one another.

Computer system 900 may transmit and receive messages, data, and instructions, including programs (e.g., application code), through communications link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method to preserve an inter-process connection between two endpoints during patching operations, the method comprising:
   suspending at least some communication activity for a client process such that an execution of the client process that corresponds to the communication activity for the client process is paused, while preserving one or more functioning states of the inter-process connection at least by saving information about the execution of the client process via the inter-process connection for later access after a patch operation is performed;
   implementing a wait state during which the execution of the client process is paused, and one or more incoming requests from the client process are blocked from execution until at least the patch operation is complete;
   producing a patched endpoint by performing the patch operation to one of the endpoints of the inter-process connection while the at least some communication activity remains suspended; and
   reconfiguring at least some of the one or more functioning states, which have been preserved, of the inter-process connection to connect to the patched endpoint.

2. The method of claim 1, further comprising resuming communication activity over the connection, using the patched endpoint.

3. The method of claim 1, wherein the inter-process connection comprises a connection between a server process and a client process.

4. The method of claim 1, wherein preserving one or more functioning states of the inter-process connection comprises a keep-alive operation.

5. The method of claim 1, wherein the suspending at least some communication activity over the inter-process connection is performed using a surrogate process.

6. The method of claim 5, wherein initiation of the suspending is responsive to a cloud tenant indication.

7. The method of claim 1, wherein the suspending at least some communication activity over the inter-process connection is performed using a process table.

8. The method of claim 1, wherein the reconfiguring at least some of the one or more preserved functioning states of the inter-process is performed using a surrogate process.

9. The method of claim 1, wherein a first endpoint of the inter-process connection is a client process and a second endpoint of the inter-process connection is a server process.

10. A computer program product embodied in a non-transitory computer readable medium, the computer readable medium having stored thereon a sequence of instructions which, when executed by a processor causes the processor to execute a set of acts to preserve an inter-process connection between two endpoints during patching operations, the set of acts comprising:

suspending at least some communication activity for a client process such that an execution of the client process that corresponds to the communication activity for the client process is paused, while preserving one or more functioning states of the inter-process connection by saving information about the execution of the client process via the inter-process connection for later access after a patch operation is performed, implementing a wait state during which the execution of the client process is paused, and one or more incoming requests from the client process are blocked from execution until at least the patch operation is complete;

producing a patched endpoint by performing the patch operation to one of the endpoints of the inter-process connection while the at least some communication activity remains suspended; and reconfiguring at least some of the one or more functioning states, which have been preserved, of the inter-process connection to connect to the patched endpoint.

11. The computer program product of claim 10, further comprising instructions for resuming communication activity over the connection, using the patched endpoint.

12. The computer program product of claim 10, wherein the inter-process connection comprises a connection between a server process and a client process.

13. The computer program product of claim 10, wherein preserving one or more functioning states of the inter-process connection comprises a keep-alive operation.

14. The computer program product of claim 10, wherein the suspending at least some communication activity over the inter-process connection is performed using a surrogate process.

15. The computer program product of claim 14, wherein initiation of the suspending is responsive to a cloud tenant indication.

16. The computer program product of claim 10, wherein the suspending at least some communication activity over the inter-process connection is performed using a process table.

17. The computer program product of claim 10, wherein the reconfiguring at least some of the one or more preserved functioning states of the inter-process is performed using a surrogate process.

18. The computer program product of claim 10, wherein a first endpoint of the inter-process connection is a client process and a second endpoint of the inter-process connection is a server process.

19. A computer system comprising infrastructure to preserve an inter-process connection between two endpoints during patching operations, comprising:

a processor-implemented host computer comprising a process table, the host computer configured to suspend at least some communication activity for a client process such that an execution of the client process that corresponds to the communication activity for the client process is paused, while preserving one or more functioning states of the inter-process connection at least by saving information about the execution of the client process via the inter-process connection for later access after a patch operation is performed;

a processor-implemented cloud server comprising a process manager, the cloud server configured to implement a wait state during which the execution of the client process is paused, and one or more incoming requests from the client process are blocked from execution until at least the patch operation is complete, to produce a patched endpoint by performing the patch operation to one of the endpoints of the inter-process connection while the at least some communication activity remains suspended, and to invoke reconfiguration of at least some of the one or more functioning states, which have been preserved, of the inter-process connection to connect to the patched endpoint.

20. The computer system of claim 19, wherein the cloud server is further configured to re-establish communication activity over the connection, using the patched endpoint.

* * * * *